Patented Dec. 2, 1952

2,620,359

UNITED STATES PATENT OFFICE 2,620,359

GLYCOL ETHERS OF ALPHA-PHENYLETHYL ALCOHOL

Edgar C. Britton and Arthur R. Sexton, Midland, Mich., assignors to The Dow Chemical Company, Midland, Mich., a corporation of Delaware No Drawing. Application September 26, 1947, Serial No. 776,398

10 Claims. (Cl. 260—611)

This invention concerns new glycol ethers, and glycol ether-esters, of alpha-phenylethyl alcohol and a method of making the same.

The new glycol ethers and glycol ether-esters of alpha-phenylethyl alcohol have the general formula:

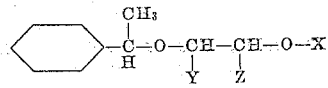

wherein X is hydrogen, an acyl radical of a saturated aliphatic carboxylic acid, or a benzoyl radical, and one of the symbols Y and Z represents hydrogen and the other represents hydrogen or the methyl, ethyl, chloromethyl or phenyl radical.

The glycol ethers and glycol ether-esters of alpha-phenylethyl alcohol having the above formula are high boiling, water-white to light yellow-colored liquids of low volatility or low melting solids. They are resistant to hydrolysis, to decomposition by heat, and to discoloration by light. They are useful as plasticizers for thermoplastic cellulose derivatives such as cellulose ethers and esters and for polyvinyl resins.

The above-mentioned glycol ethers of alpha-phenylethyl alcohol may be made by heating a mixture of alpha-phenylethyl alcohol and an alkylene oxide to a reaction temperature under superatmospheric pressure in the presence of a mixture of a small amount of an alkali metal cyanide or an alkaline earth metal cyanide and water as a catalyst, and thereafter separating the glycol ethers from the reacted mixture in any conventional manner, e. g. by fractional distillation. As alternative procedure, a mixture of alpha-phenylethyl alcohol and catalytic amounts of an inorganic cyanide and water may be heated to a reaction temperature in a closed vessel and the alkylene oxide thereafter be added under pressure. Such ethers may also be made by pumping a mixture of alpha-phenylethyl alcohol, catalyst and alkylene oxide continuously under pressure through a heated coil at a rate such that substantially all of the alkylene oxide is reacted during passage through the heated zone. The inorganic cyanides herein referred to are obtainable by reacting an alkali metal hydroxide or an alkaline earth metal hydroxide with hydrocyanic acid.

The alkylene oxides that may be used in the present invention have the general formula:

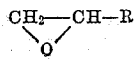

wherein R represents hydrogen or the methyl, ethyl, chloromethyl or phenyl radical.

The reactants may be employed in any proportions desired, although we generally use from 2 to 10 mols of the alpha-phenylethyl alcohol per mol of the alkylene oxide used. The reaction proceeds most smoothly and rapidly at temperatures between about 100° C. and 220° C., but somewhat lower or higher temperatures can be used. For convenience the reaction is ordinarily carried out by heating a mixture of alpha-phenylethyl alcohol and from 0.1 per cent to 5 per cent of an alkali metal cyanide or an alkaline earth metal cyanide and from 0.2 per cent to 10 per cent of water, based on the amount of alpha-phenylethyl alcohol used, to a temperature of 140° C. to 150° C. in a pressure-resistant vessel and thereafter adding the alkylene oxide under pressure. From 4 to 8 hours of heating in the closed vessel is usually required for completion of the reaction. The reacted mixture is then removed from the vessel, filtered, and the products are separated by fractional distillation. Mixtures of alpha-phenylethyl alcohol and an alkylene oxide react smoothly and rapidly under the above-described conditions to form the alpha-phenylethyl ethers of mono-, di-, and polyglycols.

The foregoing glycol mono-ethers of alpha-phenyl-ethyl alcohol may be esterified, e. g. by reaction with acyl halides, in the presence of a liquid amine, such as pyridine, quinoline, aniline or cyclohexyl amine in amount sufficient to react with the hydrogen halide which is formed. If desired, the amine may be used in excess over the amount just stated, e. g. one to 4 mols of the amine per mol of the acyl halide used. Inert organic solvents may be added to maintain the reactants in a fluid state, e. g. ethylene dichloride, propylene dichloride, benzene, toluene, and the like. The reactants may be used in substantially equal molecular proportions although generally a slight excess of the acyl halide is employed, e. g. from one to 1.5 mols of the acyl halide per mol of the glycol mono-alpha-phenylethyl ether used. Larger proportions of the acyl halide may be used but such practice is wasteful of the acyl halide.

In making the esters of the foregoing glycol monoethers of alpha-phenylethyl alcohol, the amine, e. g. pyridine, is dissolved in from 2 to 8 volumes of an inert organic solvent such as ethylene dichloride, and the acyl halide diluted with from one to 4 volumes of the same organic solvent, added thereto with stirring, at a temperature below about 10° C. The glycol mono-alpha-phenylethyl ether is diluted with from one to 4 volumes of the same inert organic solvent and thereafter added gradually to the acyl halide-pyridine mixture at a temperature of 10° C. or lower. After all of the reactants are added, the mixture is gradually warmed on a water bath to a temperature of from 60° C. to 65° C. Heating is continued for about three hours or until the reaction is complete. The reacted mixture is diluted with from one to 4 volumes of water, whereupon it separates into an oil layer containing the crude product and a water layer. The oil layer is separated and again washed with water. The product may be separated from the oil layer in any conventional manner, e. g. fractional distillation.

The following examples describe certain ways in which the invention has been practiced, but are not to be construed as limiting the invention.

*Example 1*

610 grams (5.0 mols) of alpha-phenylethyl alcohol, 3 grams of sodium cyanide, and 5 grams of water were heated with stirring to a temperature of 150° C. Ethylene oxide was then added to the heated mixture under a pressure of from 200 to 230 mm. of Hg by means of a tube extending below the surface of the liquid. The temperature was maintained at 140°–150° C. throughout the reaction. 96 grams (2.18 mols) of ethylene oxide were added during a period of 7.5 hours. The reaction mixture was fractionally distilled. After removal of unreacted alpha-phenylethyl alcohol, the product contained 82 grams of ethylene glycol mono-alpha-phenylethyl ether distilling at 84°–86° C. at 1.1 mm. of mercury, absolute pressure. The product was analyzed and found to contain:

|   | Found | Theory |
|---|---|---|
|   | *Percent* |   |
| C | 72.17 | 72.29 |
| H | 8.54 | 8.43 |

Its formula is:

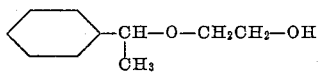

*Example 2*

183 parts (1.50 mols) of alpha-phenylethyl alcohol, 0.93 part of sodium cyanide and 1.48 parts of water were heated in an iron autoclave to 150° C. 33 parts (0.75 mol) of ethylene oxide were added under a pressure of from 10 to 25 pounds per square inch, gauge, during a period of 8 hours. The temperature was held at 145° C. to 150° C. during the reaction period. The reacted mixture was filtered and subjected to fractional distillation. After removal of unreacted alpha-phenylethyl alcohol and ethylene oxide, the product contained 56.8 per cent by weight of ethylene glycol mono-alpha-phenylethyl ether distilling at 116°–118° C. at 5.1 mm. of Hg, 13.2 per cent of diethylene glycol mono-alpha-phenylethyl ether having a boiling range of 125°–128° C. at 1.4 mm. of Hg, and 30 per cent of liquid higher boiling polyethylene glycol ethers of alpha-phenylethyl alcohol. The ethylene glycol mono-alpha-phenylethyl ether was further purified by redistillation. Its formula and properties are:

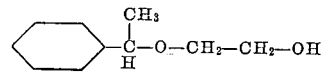

Boiling point=122° C. at 10 mm. of Hg
Density ($d$ 25/25)=1.0405
Refractive index ($n$ 25/$d$)=1.4890

The diethylene glycol mono-alpha-phenylethyl ether was redistilled. It boils at 120° C. at 1 millimeter absolute pressure and has the formula:

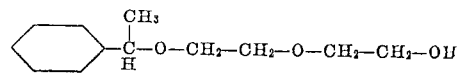

*Example 3*

244 grams (2.0 mols) of alpha-phenylethyl alcohol, 58 grams (1.0 mol) of propylene oxide, 12 grams of barium cyanide and 24 grams of water were heated in an iron autoclave to a temperature of from 150° C. to 160° C. The pressure dropped from 28 pounds per square inch gauge to zero pounds per square inch in one hour, but heating was continued for a total period of 4 hours. The reaction mixture was removed from the autoclave, filtered to remove insoluble impurities, and the filtrate fractionally distilled. There was obtained 85 grams (0.472 mol) of propylene glycol mono-alpha-phenylethyl ether, a water-white liquid, distilling at 90°–97° C. at 3 mm. of mercury absolute pressure, and having a density ($d$ 25/25)=1.0068 and a refractive index ($n$ 25/$d$)=1.4965. The residue consisted of 21 grams of liquid higher boiling ethers.

*Example 4*

7320 parts (60 mols) of alpha-phenylethyl alcohol, 40 parts of sodium cyanide and 80 parts of water were heated in a closed reactor to a temperature of 140° C. 1600 parts (27.6 mols) of propylene oxide were added to the reactor under a pressure of 30–35 pounds per square inch gauge during a period of 4 hours. The temperature was maintained at 135°–140° C. throughout the reaction period. The reaction products were filtered and subjected to fractional distillation. After removal of unreacted alpha-phenylethyl alcohol and propylene oxide, the product contained 78.6 per cent by weight of propylene glycol mono-alpha-phenylethyl ether and 21.4 per cent of liquid higher boiling compounds. The distillation was continued to separate these products. The propylene glycol mono-alpha-phenylethyl ether possesses the following properties:

Boiling range=83–93° C. at 1.5 mm. Hg
Density ($d$ 25/25)=1.0066
Refractive index ($n$ 25/$d$)=1.4970

*Example 5*

183 grams (1.5 mols) of alpha-phenylethyl alcohol, 120 grams (1.0 mol) of styrene oxide, 5 grams of barium cyanide, and 10 grams of water were heated for 4 hours in an iron autoclave at a temperature of 150° C. The reaction product was removed from the autoclave, filtered to remove insoluble impurities, and the filtrate fractionally distilled. There was obtained 48 grams (0.215 mol) of phenylethylene glycol mono-alpha-phenylethyl ether, a pale yellow-colored liquid, distilling at 118°–125° C. at 3 millimeters of mercury pressure absolute. The ether product was purified by crystallization from a mixture of equal parts by volume of benzene and petroleum ether. It crystallized as a white flocculent precipitate. The purified ether product had a freezing point of 65.5°–67° C.

Example 6

1500 grams of ethylene dichloride and 316 grams (4.0 mols) of pyridine were placed in a three-necked flask equipped with a reflux condenser and an agitator and the mixture cooled in an ice bath to 6° C. to 8° C. There was then added dropwise, while maintaining the temperature at below 10° C., a mixture consisting of 236 grams (3.0 mols) of acetyl chloride in 500 grams of ethylene dichloride. While still keeping the temperature below 10° C., there was next added dropwise a mixture consisting of 332 grams (2.0 mols) of ethylene glycol mono-alpha-phenylethyl ether in 500 grams of ethylene dichloride. The mixture was gradually warmed to room temperature and then heated on a water bath at 60°–65° C. for three hours. The reacted mixture was washed with water and the oil layer containing the crude product separated and subjected to fractional distillation. There was obtained 412 grams (1.98 mols) of ethylene glycol mono-alpha-phenylethyl ether acetate, i. e. acetic acid, 2-(1-phenylethoxy) ethyl ester, as a water-white liquid. The yield was 99 per cent of theoretical. The product has the following formula and properties:

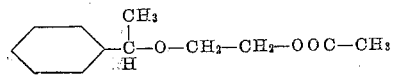

Boiling point=258° C. at 750 mm. of Hg
Density ($d$ 25/25) =1.0411
Refractive index ($n$ 25/$d$) =1.4890

Example 7

By procedure similar to that described in Example 6, 254 grams (2.25 mols) of chloroacetyl chloride in 300 grams of ethylene dichloride were added to 316 grams (4.0 mols) of pyridine in 400 grams of ethylene dichloride. 332 grams (2.0 mols) of ethylene glycol mono-alpha-phenylethyl ether in 300 grams of ethylene dichloride were then reacted with the acyl halide-pyridine mixture. There was obtained 229 grams (0.94 mol) of chloroacetic acid, 2-(1-phenylethoxy) ethyl ester as a water-white liquid. The yield was 47 per cent of theoretical. The product has the following formula and properties:

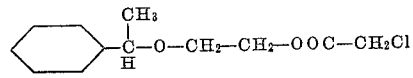

Boiling point=180° C. at 18 mm. Hg
Density ($d$ 25/25) =1.1592
Refractive index ($n$ 25/$d$) =1.5060

Example 8

332 grams (2.0 mols) of ethylene glycol mono-alpha-phenylethyl ether in 500 grams of ethylene dichloride were reacted with a mixture consisting of 231 grams (2.5 mols) of propionyl chloride in 500 grams of ethylene dichloride and 198 grams (2.5 mols) of pyridine in 1000 grams of ethylene dichloride. The procedure in carrying out the reaction was similar to that described in Example 6. There was obtained 336 grams (1.514 mols) of propionic acid, 2-(1-phenyloxy) ethyl ester, as a water-white liquid. The yield was 75.7 per cent of theoretical, and the product has the properties:

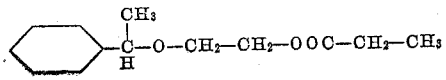

Boiling point=145° C. at 10 mm. Hg
Density ($d$ 25/25) =1.0255
Refractive index ($n$ 25/$d$) =1.4860

Example 9

By procedure similar to that described in Example 6, 332 grams (2.0 mols) of ethylene glycol mono-alpha-phenylethyl ether in 500 grams of ethylene dichloride were reacted with a mixture consisting of 351 grams (2.5 mols) of benzoyl chloride and 197 grams (2.48 mols) of pyridine in 2000 grams of ethylene dichloride. There was obtained 527 grams of ethylene glycol mono-alpha-phenylethyl ether benzoate, i. e. benzoic acid, 2-(1-phenylethoxy) ethyl ester. The yield was 97.5 per cent of theoretical. The compound was a viscous pale yellow-colored liquid. It has the following formula and properties:

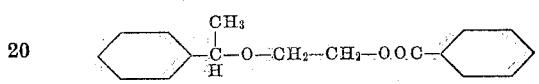

Boiling point=100° C. at 0.03 mm. Hg (30 microns)
Density ($d$ 25/25) =1.1000
Refractive index ($n$ 25/$d$) =1.5440

The glycol ethers and glycol ether-esters of alpha-aralkyl alcohols are in general colorless to pale yellow-colored liquids or low melting solids. They are resistant to decomposition by heat and to discoloration by light. As pointed out previously, they are excellent plasticizers for plastic cellulosic materials and vinyl plastics. Such plastic materials include: (1) cellulose esters and ethers such as cellulose acetate, ethyl cellulose, benzyl cellulose, cellulose acetobutyrate and the like; (2) vinyl plastics such as plastics derived from vinyl esters, for example, vinyl chloride, vinyl acetate, vinyl chloride-vinyl acetate copolymers, vinyl propionate, polyvinyl acetal and the like; (3) vinylidene plastics such as copolymers of vinylidene chloride-vinyl chloride, vinylidene chloride-ethyl acrylate, vinylidene chloride-vinyl acetate, vinylidene chloride-styrene and the like.

Other modes of applying the principle of our invention may be employed instead of those explained, change being made as regards the method or products herein disclosed, provided the steps or compounds stated in any of the following claims or the equivalent of such stated steps or compounds be employed.

We claim:

1. A glycol mono-alpha-phenylethyl ether having the general formula:

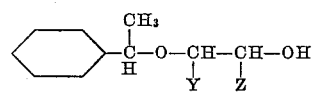

wherein one of the symbols Y and Z represents hydrogen and the other represents a member of the group consisting of hydrogen and the methyl, ethyl and phenyl radicals.

2. Ethylene glycol mono-alpha-phenylethyl ether.

3. Propylene glycol mono-alpha-phenylethyl ether.

4. Phenylethylene glycol mono-alpha-phenylethyl ether.

5. The process of making a glycol mono-alpha-phenylethyl ether having the general formula:

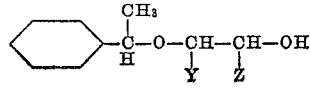

wherein one of the symbols Y and Z represents hydrogen and the other represents a member of the group consisting of hydrogen and the methyl, ethyl and phenyl radicals which comprises reacting an alkylene oxide having the general formula:

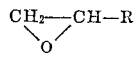

wherein R is a member of the group consisting of hydrogen and the methyl, ethyl and phenyl radicals, with alpha-phenylethyl alcohol at a temperature between 100° and 220° C. in the presence of from 0.1 per cent to 5 per cent of a cyanide selected from the group consisting of the alkali metal cyanides and the alkaline earth metal cyanides, and from 0.2 per cent to 10 per cent of water, based on the weight of the alpha-phenylethyl alcohol.

6. The process of making a propylene glycol mono-alpha-phenylethyl ether which comprises reacting propylene oxide with alpha-phenylethyl alcohol in the presence of from 0.1 per cent to 5 per cent of an alkaline earth metal cyanide and from 0.2 per cent to 10 per cent of water.

7. The process of making ethylene glycol mono-alpha-phenylethyl ether which comprises reacting ethylene oxide with alpha-phenylethyl alcohol in the presence of from 0.1 per cent to 5 per cent of an alkali metal cyanide and from 0.2 per cent to 10 per cent of water.

8. The process of making a propylene glycol mono-alpha-phenylethyl ether which comprises reacting propylene oxide with alpha-phenylethyl alcohol in the presence of from 0.1 per cent to 5 per cent of barium cyanide and from 0.2 per cent to 10 per cent of water.

9. The process of making ethylene glycol mono-alpha-phenylethyl ether which comprises reacting ethylene oxide with alpha-phenylethyl alcohol in the presence of from 0.1 per cent to 5 per cent of sodium cyanide and from 0.2 per cent to 10 per cent of water.

10. The process of making phenylethylene glycol mono-alpha-phenylethyl ether which comprises reacting styrene oxide with alpha-phenylethyl alcohol in the presence of from 0.1 per cent to 5 per cent of barium cyanide and from 0.2 per cent to 10 per cent of water.

EDGAR C. BRITTON.
ARTHUR R. SEXTON.

REFERENCES CITED

The following references are of record in the file of this patent:

UNITED STATES PATENTS

| Number | Name | Date |
|---|---|---|
| 1,931,858 | Baur | Oct. 24, 1933 |
| 2,053,708 | Fife | Sept. 8, 1936 |
| 2,066,076 | Reppe et al. | Dec. 29, 1936 |
| 2,174,761 | Schuette et al. | Oct. 3, 1939 |
| 2,327,053 | Marple et al. | Aug. 17, 1943 |
| 2,372,615 | Thomas et al. | Mar. 27, 1945 |
| 2,380,185 | Marple et al. | July 10, 1945 |

OTHER REFERENCES

Bergmann Helv. Chim. Acta, 20, 590–621 (1937).